United States Patent Office 3,686,253
Patented Aug. 22, 1972

3,686,253
**LINEAR 1,3,3,7 - TETRACHLOROHEXAMETH-
YLTETRASILOXANE AND THE PRODUC-
TION THEREOF**
Everett W. Bennett, Longmeadow, Mass., assignor to
Union Carbide Corporation, New York, N.Y.
No Drawing. Original application Dec. 27, 1968, Ser. No.
787,544, now Patent No. 3,642,851. Divided and this
application Apr. 2, 1971, Ser. No. 130,843
Int. Cl. C07f 7/08
U.S. Cl. 260—448.2 R          2 Claims

ABSTRACT OF THE DISCLOSURE

Linear 1,3,3,7-tetrachlorohexamethyltetrasiloxane and a process for preparing same which comprises heating linear 1,1,1,7 - tetrachlorohexamethyltetrasiloxane at about 90° C. The novel compound is useful to form heat curable silicone resins or elastomers.

---

This application is a divisional of application Ser. No. 787,544, filed Dec. 27, 1968, now U.S. Pat. 3,642,851.

BACKGROUND OF THE INVENTION

This invention relates to a process for producing linear halosiloxane polymers. More particularly this invention relates to a process for preparing linear halosiloxane polymers through the redistribution of halosilanes with cyclosiloxane compounds and to novel linear halo endblocked siloxanes.

Heretofore, linear halosiloxane polymers have been prepared by equilibrium reactions of halosilanes with organopolysiloxanes. However, such types of processes have undesirable features, for example, reaction conditions are often so severe as to cause cleavage of certain radicals, such as phenyl and vinyl radicals from the silicon atoms. Moreover, the use of catalysts, such as hydrogen halides or Lewis acids can lead to rearrangement of the SiOSi bonds of the polymer as well as cleavage of such organic radicals from the silicon atoms of the reactants. More recently it has been proposed that the above drawbacks may be overcome by preparing linear halosiloxane polymers through the redistribution of halosilanes with cyclotrisiloxane in the absence or presence of an amine or amine salt catalyst, as witnessed by U.S. Pat. 3,162,662. However, this known procedure is restricted to the use of only cyclotrisiloxanes.

SUMMARY OF THE INVENTION

It has now been discovered that the above disadvantages can be overcome and that linear halosiloxane polymers may be obtained through the redistribution of halosilanes with cyclotrisiloxane or cyclotetrasiloxane in the presence of a phosphine oxide or amine oxide catalyst.

Therefore it is an object of this invention to provide an efficient and economical process for preparing linear halosiloxane polymers. It is also an object to provide a process for selectively preparing low molecular weight halosiloxane polymers in high yields. Another object is to provide novel low molecular weight short-chain halosiloxane compounds. Other objects and advantages of this invention will become readily apparent from the following description and appended claims.

More specifically, one process aspect of the instant invention may be described as a method for preparing low molecular weight linear halopolysiloxanes which comprises interreacting, in the presence of a catalytic amount of a basic catalyst selected from the group consisting of phosphine oxides, amine oxides or mixtures thereof, (A) an organocyclosiloxane having the formula $(R_2SiO)_n$ wherein each R is radical independently selected from the group consisting of a hydrogen atom, monovalent hydrocarbon radicals and monovalent substituted hydrocarbon radicals and wherein n is an integer of 3 or 4, with (B) a halosilane having the formula $RmSiX_{4-m}$ wherein each R is the same as defined above, each X is a halogen atom and m has a value of from 0 to 3 inclusive; whereby the cyclicsiloxane forms a linear siloxane polymer having attached to one of its terminal silicon atoms a halogen atom from the silane and having attached to its other terminal silicon atom through a siloxane linkage the silicon atom of the silane from which the halogen atom separated.

DESCRIPTION OF THE PREFERRED EMBODIMENTS

The cyclosiloxanes which can be used in the redistribution process of this invention include cyclotrisiloxanes, $[R_2SiO]_3$, as well as cyclotetrasiloxanes, $[R_2SiO]_4$, wherein each R radical of said cyclosiloxanes independently represents a radical selected from the group consisting of a hydrogen atom, a monovalent hydrocarbon radical having from 1 to 18 carbon atoms and a substituted monovalent hydrocarbon radical. Such cyclosiloxanes as well as methods for their preparation are well known in the art. Illustrative examples of such monovalent hydrocarbon radicals are alkyl radicals such as methyl, ethyl, propyl, isopropyl, butyl, isobutyl, tertbutyl, 2-ethylhexyl, decyl, dodecyl, octadecyl and the like; alkenyl radicals such as vinyl, allyl, hexadienyl and the like; aryl radicals such as, phenyl, naphthyl and the like; alkaryl radicals such as methylphenyl, dimethylphenyl and the like; aralkyl radicals, such as, benzyl, phenylethyl and the like; cycloalkyl radicals such as cyclopentyl, cyclohexyl and the like and cycloalkenyl radicals such as, cyclopentenyl, cyclohexenyl and the like. Illustrative substituents that may be carried by the above hydrocarbon radicals include halogen, cyano, acyloxy radicals and the like. Such types of substituted hydrocarbons that may be mentioned are 2,4,6-trichlorobenzyl, chlorophenyl, beta-cyanoethyl, gamma-cyanopropyl, gamma-chloropropyl, gamma-methacryloxypropyl and the like. Preferably each R individually represents a radical selected from the group consisting of hydrogen, methyl, ethyl, vinyl, and phenyl radicals and most preferably every R is a methyl or ethyl radical. Among the preferred cyclosiloxanes that may be mentioned are hexamethyltrisiloxane, octamethyltetrasiloxane, and the like. The more preferred compounds are the cyclotetrasiloxanes, especially octamethyltetrasiloxane.

The halosilanes which are employable in the redistribution of this invention include any silane having from one, two, three or four halogen atoms and having the formula $RmSiX_{4-m}$ wherein each R is the same as defined above, m has a value of from 0 to 3 inclusive and each X represents a halogen atom such as chlorine, bromine, iodine and fluorine, with chlorine being the most preferred. Such halosilanes as well as methods for their preparation are well known in the art. Illustrative examples of such silane compounds include those of the formulas, $SiCl_4$, $HSiCl_3$, $RSiCl_3$, $H_2SiCl_2$, $R_2HSiCl_2$, $H_3SiCl$, $R_3SiCl$, $RH_2SiCl$ and $R_2HSiCl$ where each R is a monovalent or substituted monovalent hydrocarbon radical as defined above. Among the more preferred chlorosilanes that may be mentioned are $SiCl_4$, MeSiCl₃, EtSiCl₃, Me₂SiCl₂, MeEtSiCl₂, MeφHSiCl, φ₂SiCl₂, Et₂SiCl₂, Me₃SiCl, Et₃SiCl, Me₂HSiCl, CN(CH₂)₂SiMeCl₂, CN(CH₂)₃SiMeCl₂, CN(CH₂)₄SiMeCl₂, CN(CH₂)₃SiMeCl₂, CN(CH₂)₃SiCl₃, Cl(CH₂)₂SiMeCl₂, Cl(CH₂)₃SiMeCl₂, Br(CH₂)₃SiMeCl₂, MeO(CH₂)₃SiMeCl, MeO(CH₂)₄SiMeCl, MeφSiCl₂, φ₂SiCl₂, φC₂H₄SiMeCl₂, Cl₃φSiCl₃, MeViSiCl₂, ViSiCl₃ and the like. The most preferred chlorosilanes are the dichlorosilanes, especially Me₂SiCl₂. In the above formulas and throughout the rest of this disclosure Me represents a methyl (—CH₃), radical; Et represents an ethyl (—C₂H₅) radical and φ represents a phenyl (—C₆H₅) radical, Vi represents a vinyl (—CH=CH) radical.

As pointed out above the redistribution process of this invention must be carried out in the presence of a basic catalyst such as a phosphine oxide, an amine oxide, or mixtures of said oxide compounds. The expression phosphine oxide as used herein encompasses any compound containing an oxygen atom solely and directly attached to the phosphorus atom. Such phosphine oxides as well as methods for their preparation are well known in the art, as shown in "Organophosphorus Compounds" by Kosolapoff (1950) published by J. Wiley & Sons Inc., New York. Illustrative examples of such phosphine oxides include φ₃PO, (CH₃)₃PO, (C₄H₉)₃PO, φ₂(C₄H₉)PO, φ(C₄H₉)₂PO, (φCH₂)₃PO, (C₈H₁₇)₃PO, (Me₂N)₃PO, (Me₂N)₃PO·SiCl₄,

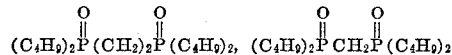

and the like. The symbols Me and φ are the same as defined above. The preferred phosphine oxide catalysts have the formula R₃PO wherein each R individually represents a radical selected from the group consisting of alkyl having from 1 to 8 carbon atoms, phenyl and dimethylamino radicals, especially φ₃PO, (n-C₄H₉)₃PO and [(CH₃)₂N]₃P=O. The expression amine oxide as used herein encompasses any compound containing an oxygen atom solely and directly attached to a nitrogen atom. Such amine oxides as well as methods for their preparation are well known in the art, as shown in "Advanced Organic Chemistry" by Fuson (1950) published by J. Wiley & Sons Inc., New York.

The preferred amine oxide catalysts have the formula R₃NO wherein each R individually represents a monovalent hydrocarbon radical having from 1 to 8 carbon atoms and selected from the group consisting of alkyl, aryl, alkaryl, aralkyl and cycloalkyl radicals, such as methyl, ethyl, propyl, isopropyl, butyl, tert-butyl, 2-ethylhexyl, octyl, phenyl, benzyl, toluene, cyclohexyl and the like, or each R and N taken collectively can form a heterocyclic ring structure such as pyridine and the like. Illustrative examples of some of the more preferred amine oxides include, pyridine N-oxide, 2,6-dimethylpyridine N-oxide, 4-methylpyridine N-oxide, 2-methylpyridine N-oxide, 4-cyanopyridine N-oxide, triphenyl N-oxide and the trialkyl N-oxides having from 1 to 8 carbon atoms such as trimethyl N-oxide, triethyl N-oxide, tributyl N-oxide, trioctyl N-oxide and the like.

The amount of catalyst employed is not critical for it obviously need only be a catalytic amount. Generally amounts of catalysts ranging from about 0.1 to about 2 percent by weight based on the total weight of silicon reactants employed will be sufficient although more than about 2 percent by weight of catalyst can be employed if desired.

In the redistribution reaction of this invention the general feature is the interreaction of the chlorosilane with the cyclosiloxane whereby the cyclosiloxane chain is split so that it is converted to a linear siloxane polymer having attached to one of its terminal silicon atoms a chlorine atom from the chlorosilane starting material and having attached to its other terminal silicon atom through a siloxane linkage the silicon atom of said silane from which the chlorine atom separated. This general reaction can be described by the following illustrative equation.

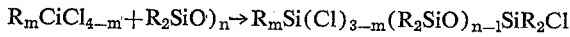

wherein m, n and each R is the same as defined above. Along with the more preferred chlorosiloxane products containing four or five silicon atoms per molecule as outlined above, further redistribution side products such as the longer chain linear chlorosiloxane polymers for example, Cl₂Si[(OSiR₂)ₓCl]₂; ClRSi[(OSiR₂)ₓCl]₂ and the like where each R is the same as defined above and x is 3 or 4 or higher may result. Note the cyclotrisiloxane redistribution in U.S. Pat. 3,162,662. Thus, the complex interplay of recognized parameters, such as the compounds involved in the process, their individual reactivity, process conditions, etc., all affect the course of the redistribution and the extent and amount of desired Si₄ or Si₅ silicon polymers and side-products produced. Accordingly, the instant process now makes it possible to produce low molecular weight chlorosiloxane polymers containing four or five silicon atoms per molecule in very good yields by coordinating said parameters under redistribution conditions sufficiently slow enough so that the desired specific products can be isolated and obtained before further redistribution and/or equilibration has occurred. The mole ratio of chlorosilane to the cyclicsiloxane employed is not critical and merely depends on the reactivity of the compounds employed and the type of product desired. For example, in general the higher the reaction rate, the higher the ratio of cyclic to silane or the greater the reactivity of the cyclic over the silane, the lower the amount of the specific linear chlorosiloxane Si₄ or Si₅ polymers obtained due to the production of more side-products. For instance, in general the cyclotrisiloxane are more reactive than the cyclotetrasiloxanes and the reactivity of the chlorosilanes is increased as one goes from a monochlorosilane to a tetrachlorosilane. Accordingly, by way of a specific example about a 1:1 mole ratio reaction of a monochlorosilane to a cyclotrisiloxane will normally produce a sizeable mixture of linear chlorosiloxane products due to the low reactivity of the monochlorosilane to cyclotrisiloxane. However, this may be off-set and a greater yield of the specific linear chlorosiloxane Si₄ polymer obtained by increasing the amount of monochlorosilane above that of the 1:1 mole ratio. Accordingly, the mole ratio is not critical but basically dependent only upon whether one wishes to obtain a mixture of related products or a high yield of a specific product. The same is true of the temperature and time of the reaction. The reaction temperature of this invention can range from room temperature up to 150° C. or higher, however, temperatures ranging from about 20° C. to 90° C. are generally preferred. The longer the reaction time the greater the possibility of further redistribution to additional linear chlorosiloxanes other than the specific Si₄ or Si₅ polymers. When high yields of these specific polymers are desired the reaction time is governed by analytical monitoring. Moreover, when mixtures of different chlorosiloxane polymers are obtained they may be employed as such or the individual classes of siloxanes may be conveniently separated and recovered if desired by such conventional methods as distillation, vapor phase chromatography and the like. Of course, it should also be understood if desired one may employ a mixture of such halosilanes and/or a mixture of the tri and tetracyclics reactants in the same redistribution process, although such is not generally preferred.

Another novel feature of the instant invention is the discovery of two distinct methods for the production of novel linear chlorosiloxane polymers having the formula

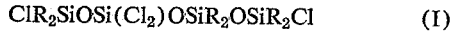

wherein each R is the same as defined above. It has been surprisingly found that these novel polymers may be produced directly by the redistribution process which comprises interreacting, in the presence of a catalytic amount of a basic catalyst selected from the group consisting of phosphine oxides, amine oxides, or mixtures thereof, said catalysts having been described above, at about 90° C., a tetrachlorosilane with a cyclotrisiloxane of the formula [R₂SiO]₃ wherein each R is the same as defined above, and wherein the mole ratio of silane to cyclic is about 1:1. For example, the redistribution reaction of about a 1:1 mole ratio of tetrachlorosilane with hexamethyltrisiloxane at about 90° C. in the catalytic presence of Me₂N)₃PO produces a good yield of a linear 1, 3, 3, 7-tetrachloro-hexamethylsiloxane polymer of the formula

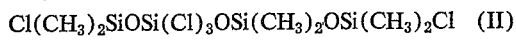

This process is indeed surprising since the same example carried out under identical conditions but at a lower temperature for instance at room temperature produces a linear 1,1,1,7 - tetrachlorohexamethylsiloxane polymer product of the formula

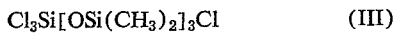

Alternatively, the novel polymers of Formula I above may also be obtained by the per se redistribution process of a linear siloxane having the formula

where each R is the same as defined above which comprises heating said siloxane at about 90° C. in the presence of a basic catalyst selected from the group consisting of phosphine oxides, amine oxides, or mixtures thereof, said catalysts having been described above. For example the redistribution of 1,1,1,7-tetrachlorohexamethylsiloxane (Formula III) above per se at 90° C. in the presence of (Me₂N)₃PO also produces a good yield of linear 1,3,3,7-tetrachlorohexamethylsiloxane, Formula II above.

The redistribution processes of this invention can also be carried out in the presence of an inert polar organic solvent having a high dielectric constant, and such is often desirable, especially when catalysts of low reactivity and/or low reactive cyclics are employed, since these inert polar organic solvents also serve as cocatalytic agents for the redistribution. Suitable inert polar organic solvents are those having a dielectric constant greater than 4, and preferably greater than 10. Such compounds are well known in the art and include halogenated liquid hydrocarbons and ethers and especially polar compounds having nitrogen present in their structure as nitrile groups, nitro groups, and amide groups. Any high dielectric constant polar organic compound may be used so long as it is inert, that is, won't adversely interfere with the basic reaction such as a hydroxy containing compound might. Illustrative examples of such inert organic polar compounds that can be employed include, chloroform, bromoform, dichloromethane, iodomethane, dibromomethane, 1,1,1-trichloroethane, o-dibromobenzene, p-fluorotoluene, methylbutyl ether, the dimethyl ether of ethylene glycol, tetrahydrofuran, β,β'-dichlorodiethylether, acetonitrile, propionitrile, butyronitrile, valeronitrile, benzonitrile, cyclohexonitrile capronitrile, succinonitrile, ethoxyacetylene, pyridine, nitromethane, nitroethane, nitropropane, nitrooctane, nitrobenzene, nitrotoluene, nitrocyclohexane, 1-chloro-2-nitrobenzene, formamide, acetamide, dimethylformamide, dimethylacetamide, tetramethylurea, ethyl carbamate and the like. The preferred polar compounds are acetonitrile and benzonitrile. The use of these inert organic polar solvents are also often desirable when one wishes to obtain the best possible yield of specific linear Si₄ or Si₅ siloxane polymer products. When employed the amount of inert polar organic compound will generally lie within the range of about 5 percent by weight up to about 25 percent by weight based on the combined weight of silicon reactants employed although higher amounts of polar compounds can be used if desired. Of course, mixtures of said inert organic polar compounds can be employed if desired. Moreover, conventional non-catalytic solvents such as aliphatic or aromatic hydrocarbons like hexane, benzene, toluene, xylene and the like as well as mixtures thereof may be used instead of the inert polar solvents mentioned above or in conjunction with said polar solvents.

Still another novel feature of the instant invention is the production of novel linear substituted hydrocarbon siloxanes of the formula

where R is the same as defined above and x is 2 or 3, and R' is a substituted alkylene radical such as betacyanoethyl, gammacyanopropyl, omegacyanobutyl, betachloroethyl, gammachloropropyl, gammabromopropyl, gammamethoxypropyl, omegamethoxybutyl and the like. For example, the redistribution reaction of about a 1:1 mole ratio of gamma-chloropropylmethyldichlorosilane with hexamethyltrisiloxane at about room temperature in the catalytic presence of (Me₂N)₃PO and acetonitrile produces a good yield of a linear 1-gammachloropropyl-1,7-dichloro-hexamethylsiloxane polymer of the formula

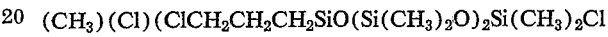

The instant invention provides a means for introducing chlorine functionality into linear siloxane polymers as well as method for producing high yields of specific chlorosiloxane polymers. The chlorosiloxane polymer products have a wide range of utility well known in the organosilicon art. For example, their use in the preparation of precise heat curable silicone resins and elastomers is well known. They can also be used as cross-linking agents or room temperature vulcanizable resins or rubber systems. In addition they can be employed as intermediates for producing a multitude of different functional siloxane polymers of high molecular weight, for instance they can be converted to alkoxy, acyloxy, hydroxy, containing siloxane polymers and they can also be used to produce amino end-blocked siloxanes, as shown for example by Union Carbide's U.S. patent application Ser. No. 672,445, filed Oct. 3, 1967, now U.S. Patent 3,667,686.

The following examples are illustrative of the present invention and are not to be regarded as limitative. It is to be understood that all parts, percentages and proportions referred to herein and in the appended claims are by weight unless otherwise indicated. The symbols Me, Et, Pr, Bu, Vi and φ represent the methyl, ethyl, n-propyl, n-butyl, vinyl and phenyl radicals.

EXAMPLE 1

A solution composed of about 148.3 grams (0.5 mole) of octamethylcyclotetrasiloxane, about 129 grams (1.0 mole) of dimethyldichlorosilane, about 4.0 grams (0.0014 mole) of triphenylphosphine oxide and 100 ml. of acetonitrile was brought to 65° C. and allowed to rise to 75° C. over 16.25 hours at which time vapor phase chromatographic analysis showed unreacted octamethylcyclotetrasiloxane, some chlorine endblocked tetrasiloxane, and an appreciable amount of linear chlorine endblocked pentasiloxane, the desired product. The acetonitrile and unreacted dimethyldichlorosilane was stripped at a pot temperature of 60° C./20 mm. and the precipitated catalyst filtered off. About 172.5 grams of linear chlorine endblocked siloxane liquid was recovered indicating a 38 percent conversion to product, the major amount of which was linear 1,9 dichlorodecamethylpentasiloxane having the formula

EXAMPLE 2

A solution of about 148.3 grams (0.5 mole) of octamethylcyclotetrasiloxane, about 97.0 grams (0.75 mole) of dimethyldichlorosilane, about 4.0 grams (0.018 mole) of tri-n-butylphosphine oxide and about 50 ml. of acetonitrile was brought to reflux at 76° C. which rose to 87.5° C. over 6.67 hours. The acetonitrile and excess dimethyldichlorosilane were removed at a pot temperature of 50° C./20 mm. About 225.8 grams of linear chlorine endblocked siloxane fluid was obtained. Vapor phase chromatography analysis of the product mixture showed it to be composed primarily of 73 percent of desired linear 1,9-dichlorodecamethylpentasiloxane along with about 17 percent of

9 percent of

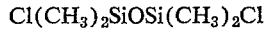

and a small amount of

Similar results may be obtained by replacing acetonitrile with other solvents such as, benzonitrile, propionitrile, acrylonitrile, bisbetachloroethyl ether, methylene chloride, chloroform, cyclohexanone, 1,1,2-trichloroethane, dimethylformamide, N-methylpyrrolidine and the like.

EXAMPLE 3

A solution composed of about 2.23 grams (0.01 mole) of hexamethylcyclotrisiloxane, about 1.23 ml. (0.01 mole) of dimethyldichlorosilane, about 0.7 ml. (0.013 mole) of acetonitrile and about 0.14 grams (0.0005 mole) of n-butyldiphenylphosphine oxide was held at room temperature (about 23° C.) for one-half hour. Vapor phase chromatography analysis of the product showed a 90 percent yield of desired linear 1,7-dichlorooctamethyltetrasiloxane polymer having the formula

EXAMPLE 4

A solution composed of about 3.0 ml. (0.0096 mole) of octamethylcyclotetrasiloxane, about 1.3 ml. (0.0107 mole) of dimethyldichlorosilane, about 0.75 ml. (0.014 mole) of acetonitrile and about 0.1 gram (0.0013 mole) of pyridine N-oxide was refluxed for twenty hours. Vapor phase chromatography analysis showed the product mixture to consist of 80 percent of desired linear dichlorodecamethylpentasiloxane and 20 percent of higher molecular weight chloro endblocked siloxanes.

A second solution composed of about 2.23 grams (0.01 mole) of hexamethylcyclotrisiloxane, about 1.3 ml. (0.0107 mole) of dimethyldichlorosilane, about 0.75 ml. (0.0146 mole) of acetonitrile, and about 0.1 grams (0.0013 mole) of pyridine N-oxide was held for one hour at 20° C. and then reacted for an additional hour at reflux. Vapor phase chromatography analysis showed a 95 percent yield of desired linear 1,7-dichlorooctamethyltetrasiloxane.

EXAMPLE 5

A solution composed of about 2.23 grams (0.01 mole) of hexamethylcyclotrisiloxane, about 1.31 grams (0.0101 mole) of dimethyldichlorosilane, about 0.9 ml. (0.017 mole) of acetonitrile, and 0.1 gram (0.00081 mole) of 2,6-dimethylpyridine N-oxide was reacted at reflux for eight hours. Vapor phase chromatography analysis of the reaction mixture showed a 95 percent yield of desired linear 1,7-dichlorooctamethyltetrasiloxane.

EXAMPLE 6

A solution composed of about 670 grams (3.02 moles) of hexamethylcyclotrisiloxane, about 362 ml. (387 grams, 3.0 moles) of dimethyldichlorosilane, about 315 ml. (1246 grams, 6.0 moles) of acetonitrile and about 13 grams (0.12 mole) of gamma-picoline N-oxide was refluxed for two hours until a constant temperature was reached.

| Time (min.): | Temperature (° C.) |
| --- | --- |
| 0 | 80 |
| 30 | 84 |
| 60 | 86 |
| 120 | 86 |

Chilling the reaction mixture to 5° C. precipitated the catalyst which was filtered off prior to nitrogen sparging of the products free of lites at 90° C. for two hours. Vapor phase chromatography analysis showed a trace of residual dimethyldichlorosilane; 1.5 percent of octamethyltetrasiloxane; 1.2 percent of $Cl(CH_3)_2SiO[Si(CH_3)_2O]_xSi(CH_3)_2Cl$ with $x$ representing 0, 1, 3, 4 and 5; and 97.3 percent of desired linear 1,7-dichlorooctamethyltetrasiloxane. The yield of linear chlorine endblocked siloxanes was 987 grams or 93.2% of theoretical.

EXAMPLE 7

A solution composed of about 120 ml. (129 grams, 1.0 mole) of dimethyldichlorosilane, about 20.2 ml. of n-undecane for an internal vapor phase chromatographic standard, about 308 ml. (296 grams, 1.0 mole) of octamethylcyclotetrasiloxane and about 105 ml. (82 grams, 2 moles) of acetonitrile and brought to reflux (about 85° C.) at which time 7.0 cc. (7.2 grams, 0.04 mole) of hexamethylphosphoramide [$(CH_3)_2N]_3PO$] catalyst was added. The course of the reaction was observed by periodically removing 1 cc. samples which were then diluted with 5 cc. of benzene and analyzed by vapor phase chromatography. In 210 minutes the reaction had proceeded to a 47.3 percent conversion to linear chlorine endblocked siloxanes with a selectivity ratio of 95 percent of desired linear 1,9-dichlorodecamethylpentasiloxane. The formula for the selectivity ratio is [the number of moles of unreacted octamethyltetracyclicsiloxane plus the number of moles of desired linear 1,9-dichlorodecamethylpentasiloxane produced divided by the number of moles of octamethyltetracyclicsiloxane starting material] multiplied by 100. On setting over the weekend at ambient temperature (about 23° C.) the conversion of the reaction mixture increased to 61.1 percent with a selectivity for desired linear 1,9-dichlorodecamethylpentasiloxane of 87 percent. The minor chloroendblocked siloxane products consisted of about 5.7 percent of

where $x$ represents 0, 1 and 2.

EXAMPLE 8

A solution composed of about 222.3 grams (1 mole) of hexamethylcyclotrisiloxane, about 191.6 grams (1 mole) of gamma-chloropropylmethyldichlorosilane, about 8.3 grams of hexamethylphosphoramide and about 45.5 grams of acetonitrile were stirred at room temperature for about 1.3 hours. The product mixture was fractionally distilled and vapor phase chromatography analysis showed the desired linear siloxane product to be 1,7-dichloro-1-gamma-chloropropylheptamethyltetrasiloxane having the formula

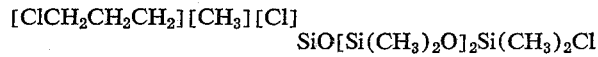

A series of six runs produced an average 88.7 mole percent yield (about 737 grams) of said desired product which had a boiling point of about 295° C./760 mm.

Other substituted hydrocarbon endblocked linear siloxanes can be similarly produced by employing in place of the above silane other silane reactants such as, betacyanoethylmethyldichlorosilane, gammacyanopropylmethyldichlorosilane, omegacyanobutylmethyldichlorosilane, betachloroethylmethyldichlorosilane, gammabromopropylmethyldichlorosilane, gammamethoxypropylmethyldichlorosilane, omegamethoxybutylmethyldichlorosilane and the like and/or by replacing the above tricyclosiloxane with a tetracyclosiloxane such as octamethylcyclotetrasiloxane and the like.

EXAMPLE 9

A solution of about 1.0 ml. (0.007 mole) of dimethyldichlorosilane, about 2.23 grams (0.01 mole) of hexamethylcyclotrisiloxane, about 0.75 ml. (0.014 mole) of acetonitrile and about 0.1 ml. (0.005 mole) of hexamethylphosphoramide was refluxed for one hour at which time vapor phase chromatography analysis showed a better than 95 percent yield of linear 1,7-dichlorooctamethyltetrasiloxane.

EXAMPLE 10

A solution composed of about 0.5 gram (0.0022 mole) of hexamethylcyclotrisiloxane, about 0.3 ml. (0.0024 mole) of dimethyldichlorosilane, about 0.4 ml. (0.0076 mole) of acetonitrile, about 3.0 ml. (0.028 mole) of toluene, and about 1.1 grams (0.002 mole) of a $$SiCl_4[((CH_3)_2N)_3PO]_2$$

complex was reacted for one-half hour at room temperature (about 20° C.) to produce a 95 percent yield of linear 1,7-dichlorooctamethyltetrasiloxane as shown by vapor phase chromatography analysis.

EXAMPLE 11

A solution composed of about 148.3 grams (0.5 mole) of octamethylcyclotetrasiloxane, about 97 grams (0.75 mole) of dimethyldichlorosilane, 4.0 grams (0.014 mole) of triphenylphosphine oxide and about 50 ml. of 1,2-dimethoxyethane was brought to 88° C. and rose to 92° C. over 7.25 hours. Stripping to pot conditions of 60° C./20 mm. followed by filtration to remove the precipitated catalyst yielded 175.6 grams of linear chlorine endblocked siloxanes representing a 42 percent conversion. Vapor phase chromatography showed the principal products to be linear 1,7-dichlorooctamethyltetrasiloxane and linear 1,9-dichlorodecamethylpentasiloxane in a 1:4 ratio respectively.

EXAMPLE 12

A solution composed of about 111.2 grams (0.5 mole) of hexamethylcyclotrisiloxane, about 126.6 grams (0.5 mole) of diphenyldichlorosilane, about 4.0 grams (0.018 mole) of tri-n-butylphosphine oxide and about 50 ml. of acetonitrile was held at 91 to 93° C. for 17.5 hours. Vapor phase chromatographic analysis showed complete consumption of the cyclotrisiloxane in the presence of a trace of 1,3-dichlorotetramethylsiloxane of the formula $$Cl(CH_3)_2SiOSi(CH_3)_2Cl$$

and the major product consisting essentially of desired linear 1,7 - dichloro-1,1-diphenylhexamethyltetrasiloxane having the formula $$Cl(\phi)_2SiO[Si(CH_3)_2O]_2Si(CH_3)_2Cl$$

where $\phi$ represents a phenyl radical.

EXAMPLE 13

Following the procedures described in the above examples for the process of this invention other linear chloroendblocked siloxanes can be prepared by reacting at reflux at least one mole of the chlorosilane monomer with at least one mole of the diorganocyclic in the presence of a catalytic amount of phosphine oxide and/or amine oxide catalyst as shown by the following illustrative table.

TABLE I

| No. | Cyclic | Silane | Catalyst | Solvent | Linear product |
|---|---|---|---|---|---|
| (1) | (Me₂SiO)₃(MeφSiO) | Me₂SiCl₂ | (Bu)₃PO | Acetonitrile | ClMe₂SiOSiMe₂OSiMeφOSiMe₂OSiMe₂Cl |
| (2) | (Me₂SiO)₄ | φ₂SiCl₂ | (Bu)₃PO | None | Clφ₂SiO(SIMe₂O)₃SiMe₂Cl |
| (3) | (Me₂SiO)₃ | SiCl₄ | (Me₂N)₃PO·SiCl₄ | Acetonitrile | Cl₃SiO(SiMe₂O)₂SiMe₂Cl |
| (4) | (Me₂SiO)₄ | MeSiCl₃ | (Me₂N)₃PO | Benzonitrile | Cl₂MeSiO(SiMe₂O)₃SiMe₂Cl |
| (5) | (Me₂SiO)₃ | φSiCl₃ | (Me₂N)₃PO | Chloroform | Cl₂φSiO(SiMe₂O)₂SiMe₂Cl |
| (6) | (Me₂SiO)₃(MeViSiO) | Me₂SiCl₂ | φ₃PO | Acetonitrile | ClMe₂SiOSiMe₂OSiMeViOSiMe₂OSiMe₂Cl |
| (7) | (Me₂SiO)₄ | MeEtSiCl₂ | φ₂(Bu)PO | Propionitrile | ClMeEtSio(SiMe₂)₃SiMe₂Cl |
| (8) | (Me₂SiO)₄ | MeφSiCl₂ | (Bu)₃PO | Bis-betachloroethylether | ClMeφSiO(SiMe₂O)₃SiMe₂Cl |
| (9) | (MeEtSiO)₄ | Et₂SiCl₂ | (φCH₂)₃PO | Propionitrile | ClEt₂SiO(SiMeEtO)₃SiMeEtCl |
| (10) | (Me₂SiO)₃ | Me₃SiCl | (Bu)₃PO | Acrylonitrile | Me₃SiO(SiMe₂O)₂SiMe₂Cl |
| (11) | (Me₂SiO)₃ | Et₃SiCl | (Bu)₃NO | Benzonitrile | Et₃SiO(SiMe₂O)₂SiMe₂Cl |
| (12) | (Me₂SiO)₃ | MeHSiCl₂ | φ₃PO | Cyclohexanone | ClMeHSiO(SiMe₂O)₂SiMe₂Cl |
| (13) | (Me₂SiO)₃ | CN(CH₂)₃SIMeCl₂ | φ₃PO | Propionitrile | Cl(Me)[CN(CH₂)₃]SiO(SiMe₂O)₂SiMe₂Cl |
| (14) | (Me₂SiO)₃ | Br(CH₂)₃SiMeCl₂ | (Me₂N)₃PO | Acetonitrile | Cl(Me)[Br(CH₂)]₃SiO(SiMe₂O)₂SiMe₂Cl |
| (15) | (Me₂SiO)₃ | MeO(CH₂)₃SiMeCl₃ | (Me₂N)₃PO | do | Cl(Me)[MeO(CH₂)₃]SiO(SiMe₂O)₂SiMe₂Cl |
| (16) | (Me₂SiO)₄ | CN(CH₂)₃SiMeCl₂ | (Bu)₃PO | do | Cl(Me)[CN(CH₂)₃]SiO(SiMe₂O)₃SiMe₂Cl |
| (17) | (Me₂SiO)₄ | Cl(CH₂)₃SiMeCl₂ | (Me₂N)₃PO | do | Cl(Me)[Cl(CH₂)₃]SiO(SiMe₂O)₃SiMe₂Cl |
| (18) | (Me₂SiO)₄ | φC₂H₄SiMeCl₂ | Me₃PO | None | Cl(Me)φC₄H₅SiO(SiO(SiMe₂O)₃SiMe₂Cl |
| (19) | (Me₂SiO)₄ | ClφSiCl₃ | (C₈H₁₇)₃PO | do | Cl₂(Clφ)SiO(SiMe₂O)₂SiMe₂Cl |
| (20) | (Me₂SiO)₄ | MeViSiCl₂ | C₅H₅NO | Acetonitrile | ClMeViSiO(SiMe₂O)₃SiMe₂Cl |
| (21) | (Me₂SiO)₄ | ViSiCl₃ | (Bu)₃PO | do | Cl₂ViSiO(SiMe₂O)₃SiMe₂Cl |
| (22) | (Me₂SiO)₃ and 4 | SiCl₃ | (Me₂N)₃PO | do | {Cl₃SiO(SiMe₂O)₂SiMe₂Cl / Cl₃SiO(SiMe₂O)₃SiMe₂Cl} |
| (23) | (Me₂SiO)₃ | Me₂SiCl₂ | Me₃NO | Methylene chloride | ClMe₂SiO(SiMe₂O)₂SiMe₂Cl |
| (24) | (Me₂SiO)₃ | Me₂SiCl₂ | (C₈H₁₇)₃NO | Acetonitrile | ClMe₂SiO(SiMe₂O)₃SiMe₂Cl |
| (25) | (Et₂SiO)₄ | Me₂SiCl₂ | (Bu)₃PO | Benzonitrile | ClMeSiO(SiEt₂O)₃SiEt₂Cl |

NOTE.—In the above table the symbol Me represents a methyl radical (—CH₃); Et represents an ethyl radical (—C₂H₅); Bu represents a n-butyl radical (—C₄H₉; Vi represents a vinyl radical (—CH₂=CH₂) and φ represents a phenyl radical (—C₆H₅).

EXAMPLE 14

A solution composed of about 224.5 grams of hexamethylcyclotrisiloxane, about 120 ml. of tetrachlorosilane, about 3.4 grams of triphenyl phosphine oxide and about 200 ml. of benzene were allowed to react at room temperature over night. Vapor phase chromatography showed the product to be comprised primarily (about 95 percent) of desired linear 1,1,1,7-tetrachlorohexamethyltetrasiloxane having the formula $$Cl_3SiO[Si(CH_3)_2O]_2Si(CH_3)_2Cl$$

The product was then heated at about 90° C. for two hours to convert the initial linear 1,1,1,7-tetrachlorohexamethyltetrasiloxane into desired linear 1,3,3,7-tetrachlorohexamethyltetrasiloxane having the formula $$Cl(CH_3)_2SiO[Si(Cl)_2O][Si(CH_3)_2O]Si(CH_3)_2Cl$$

which was recovered by vapor phase chromatography distillation. The structure of said linear 1,3,3,7-tetrachlorohexamethyltetrasiloxane was unequivocally determined by converting an aliquot of it to its fluoroanalog with Na₂SiF₆ and running a nuclear magnetic resonance test on both the chloro and fluoro analogs of said siloxane.

EXAMPLE 15

A solution composed of about 224.5 grams of hexamethylcyclotrisiloxane, about 120 ml. of tetrachlorosilane, about 3.4 grams of triphenylphosphine oxide and about 200 ml. of benzene were directly reacted at about 90° C. for two hours to produce about a 95 percent yield of desired linear 1,3,3,7-tetrachlorohexamethyltetrasiloxane which product was established by a nuclear magnetic resonance test as outlined in Example 14.

Various modifications and variations of this invention will be obvious to a worker skilled in the art and it is

What is claimed is:

1. A process for preparing linear 1,3,3,7-tetrachlorohexamethyltetrasiloxane which comprises heating linear 1,1,1,7-tetrachlorohexamethyltetrasiloxane at about 90° C.

2. [Cl][(CH$_3$)$_2$]SiO[(Cl)$_2$SiO][(CH$_3$)$_2$SiO]Si(CH$_3$)$_2$Cl.

References Cited

"Chemical Abstracts," 73, 1970, 67, 100h.

TOBIAS E. LEVOW, Primary Examiner

P. F. SHAVER, Assistant Examiner

U.S. Cl. X.R.

260—46.5 R, 37 SB, 448.2 E, 448.2 P